United States Patent
Patel et al.

(10) Patent No.: US 10,785,629 B1
(45) Date of Patent: Sep. 22, 2020

(54) DYNAMIC EMERGENCY MESSAGE FORWARDING

(71) Applicant: International Business Machines Corporation, Armonk, NY (US)

(72) Inventors: Kushal Patel, Pune (IN); Sandeep Ramesh Patil, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/514,866

(22) Filed: Jul. 17, 2019

(51) Int. Cl.
  *H04M 3/54* (2006.01)
  *H04W 4/90* (2018.01)
  *H04L 12/58* (2006.01)
  *H04W 4/02* (2018.01)
  *H04W 4/12* (2009.01)
  *H04L 29/08* (2006.01)

(52) U.S. Cl.
  CPC .............. *H04W 4/90* (2018.02); *H04L 51/14* (2013.01); *H04W 4/023* (2013.01); *H04W 4/12* (2013.01); *H04L 67/1097* (2013.01)

(58) Field of Classification Search
  CPC ......... H04W 4/025; H04W 4/48; H04W 4/14; H04L 51/14; H04L 51/046
  See application file for complete search history.

(56) References Cited

U.S. PATENT DOCUMENTS

| 5,615,253 | A | * | 3/1997 | Kocan | ..................... H04M 3/54 379/189 |
| 5,937,161 | A | | 8/1999 | Mulligan et al. | |
| 6,260,148 | B1 | | 7/2001 | Aggarwal et al. | |
| 7,136,649 | B2 | | 11/2006 | Ying et al. | |
| 7,499,973 | B2 | | 3/2009 | Couts et al. | |
| 8,060,566 | B2 | | 11/2011 | Appleman | |

(Continued)

FOREIGN PATENT DOCUMENTS

EP 2704409 A1 3/2014

OTHER PUBLICATIONS

CSRC, "Cloud Computing," Computer Security Resource Center, Oct. 2017, 3 pages, retrieved from https://csrc.nist.gov/projects/cloud-computing.

(Continued)

*Primary Examiner* — Dai Phuong
(74) *Attorney, Agent, or Firm* — Zilka-Kotab, P.C.

(57) ABSTRACT

A computer-implemented method includes receiving a first message intended for a target user device and determining that the target user device cannot receive the first message. The method also includes selecting a second user device from a dynamic list of second user devices believed to be in physical proximity to the target user device and sending a second message to the selected second user device, the second message at least referencing the first message. A system includes a processor and logic integrated with the processor, executable by the processor, or integrated with and executable by the processor. The logic is configured to perform the foregoing method. A computer program product for emergency message forwarding includes a computer readable storage medium having program instructions embodied therewith. The program instructions are executable by a computer to cause the computer to perform the foregoing method.

18 Claims, 5 Drawing Sheets

(56) References Cited

U.S. PATENT DOCUMENTS

| | | |
|---|---|---|
| 8,676,155 B2 | 3/2014 | Fan et al. |
| 9,699,629 B2 * | 7/2017 | Chang .................... H04W 4/16 |
| 2007/0165791 A1 * | 7/2007 | Simpson .............. H04M 3/533 |
| | | 379/67.1 |
| 2010/0009665 A1 * | 1/2010 | Hawkins ........... H04M 3/42348 |
| | | 455/417 |
| 2010/0189096 A1 * | 7/2010 | Flynn .................... H04L 67/327 |
| | | 370/352 |
| 2011/0293085 A1 * | 12/2011 | Imaguchi ................ H04M 3/46 |
| | | 379/211.02 |
| 2013/0012175 A1 | 1/2013 | Butterfield et al. |
| 2014/0065997 A1 * | 3/2014 | Walker ................... H04W 4/90 |
| | | 455/404.1 |
| 2014/0172990 A1 * | 6/2014 | Wan ..................... H04W 4/025 |
| | | 709/206 |
| 2014/0274007 A1 | 9/2014 | Detter et al. |
| 2017/0041883 A1 * | 2/2017 | Beattie, Jr. ............ H04W 4/029 |
| 2017/0237855 A1 | 8/2017 | Patil |
| 2018/0034962 A1 * | 2/2018 | Jing ..................... H04M 19/04 |

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

* cited by examiner

DYNAMIC EMERGENCY MESSAGE FORWARDING

BACKGROUND

The present invention relates to message forwarding, and more particularly, this invention relates to dynamic emergency message forwarding in cloud storage systems and networks.

Modern user devices and user device applications provide increasingly improved connectivity to other users. Various applications are supported by application servers which are designated to transmit messages and perform other media exchange operations between users using the internet. Various applications are widely used to communicate messages.

Messaging and email forwarding systems are useful systems for re-sending (e.g., redirecting) information to a different destination (e.g., device, email address, phone number, etc.). Conventionally, application servers alone cannot detect whether a device is unavailable; especially when the device is unavailable due to a drained battery. It may be difficult for a first user to reach a second user in an emergency situation when a device associated with the second user is unavailable. A first user may not know whether the second user is with other users, who the other users are, contact information for the other users, etc.

BRIEF SUMMARY

A computer-implemented method, according to one embodiment, includes receiving a first message intended for a target user device and determining that the target user device cannot receive the first message. The method also includes selecting a second user device from a dynamic list of second user devices believed to be in physical proximity to the target user device and sending a second message to the selected second user device, the second message at least referencing the first message.

A system, according to one embodiment, includes a processor and logic integrated with the processor, executable by the processor, or integrated with and executable by the processor. The logic is configured to perform the foregoing method.

A computer program product for emergency message forwarding, according to one embodiment, includes a computer readable storage medium having program instructions embodied therewith. The program instructions are executable by a computer to cause the computer to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of dynamic emergency message forwarding.

In one general embodiment, a computer-implemented method includes receiving a first message intended for a target user device and determining that the target user device cannot receive the first message. The method also includes selecting a second user device from a dynamic list of second user devices believed to be in physical proximity to the target user device and sending a second message to the selected second user device, the second message at least referencing the first message.

In another general embodiment, a system includes a processor and logic integrated with the processor, executable by the processor, or integrated with and executable by the processor. The logic is configured to perform the foregoing method.

In another general embodiment, a computer program product for emergency message forwarding includes a computer readable storage medium having program instructions embodied therewith. The program instructions are executable by a computer to cause the computer to perform the foregoing method.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
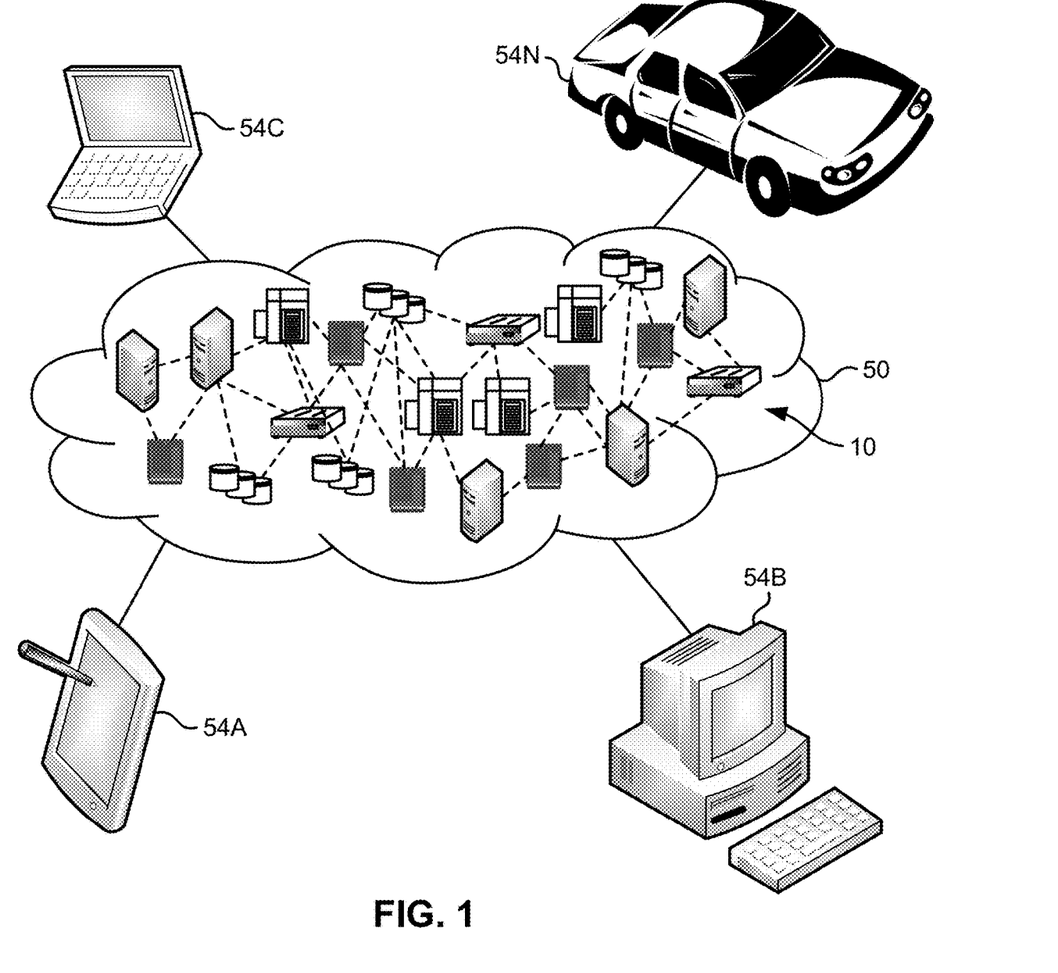
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
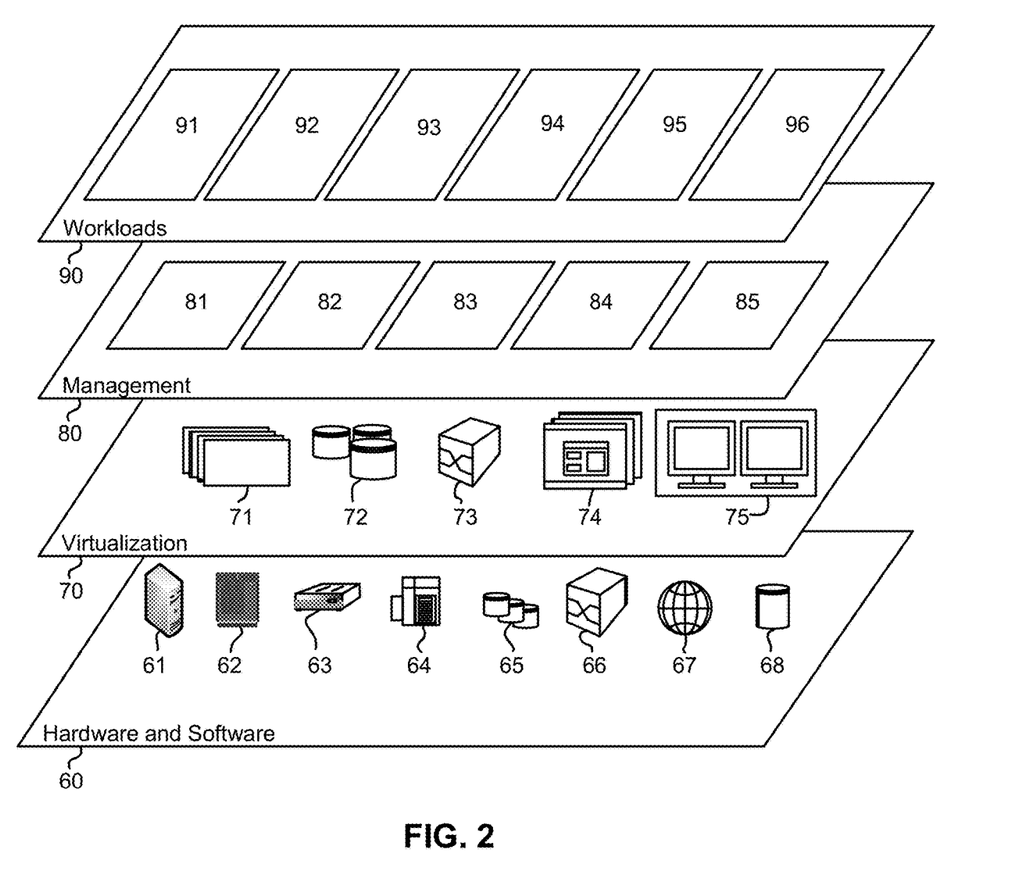
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic emergency message forwarding 96.

Modern smartphones and smartphone applications provide increasingly improved social media connectivity to users. Users may be connected to a variety of social media applications installed on smart devices. Social media applications are supported by application servers which are designated to transmit messages and perform other media exchange operations between users using the internet. For example, a WhatsApp server may listen for a message from the user-end (UE) device instances and, based on the sender and/or the receiver profile, the server forwards the message to the respective user or user-set (e.g., individual, group communication, broadcast list, etc.). Various applications for telecommunication technology with enhanced cognitive capabilities are widely used to communicate messages.

Messaging and email forwarding systems are useful systems for re-sending (e.g., redirecting) information to a different destination (e.g., device, email address, phone number, etc.). Messaging and email forwarding systems which are known in the art are limited to static, rule-based systems. It should be understood by one having ordinary skill in the art upon reading the present disclosure that "message" as used herein may refer to any type and/or content of message known in the art including text messages, email messages, audio messages, visual messages, etc., and any combination of the foregoing type and/or content of messages.

Various embodiments of the present invention provide dynamic capabilities of message forwarding. Various embodiments of the present invention autonomously communicate with UE devices and various application servers to detect unavailability of the UE devices. Unavailability may refer to low power source status (e.g., low battery status), no power source status (e.g., no battery status), no network connection, relatively poor network connection, silent mode, power off mode, etc., throughout the present disclosure as would be understood by one having ordinary skill in the art. Power sources may include batteries, solar power circuits, fuel cells, etc.

Conventionally, application servers alone cannot detect whether a device is unavailable; especially when the device is unavailable due to a discharged power source. It may be difficult for a first user to reach a second user in an emergency situation when a device associated with the second user is unavailable. A first user may not know whether the second user is with other users, who the other users are, contact information for the other users, etc. For example, a parent may know that their child is with friends at the mall but may not know which friends and/or their contact information.

Conventional message forwarding systems are limited by a user's manual input of alternative contact details and preferred policy configurations. These systems require a user to manually turn the message forwarding system on/off and/or set time periods of use. Conventional techniques are not equipped with capabilities for distinguishing between types of messages other than looking for keywords or key senders. Most conventional message forwarding systems forward all messages irrespective of the content of the message.

In stark contrast, various embodiments presented herein provide mechanisms for dynamic, context-aware message forwarding based on detection of the target user device's availability and conveys the message to a respective person based on a list of second user devices believed to be in physical proximity to the target user device. At least some of the presented embodiments use early detection of unavailability to improve the lag time of conventional message forwarding systems. Conventional static rule-based approaches for message forwarding lack the ability to make determinations based on the availability and/or unavailability of the target user device; especially in emergency situations.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
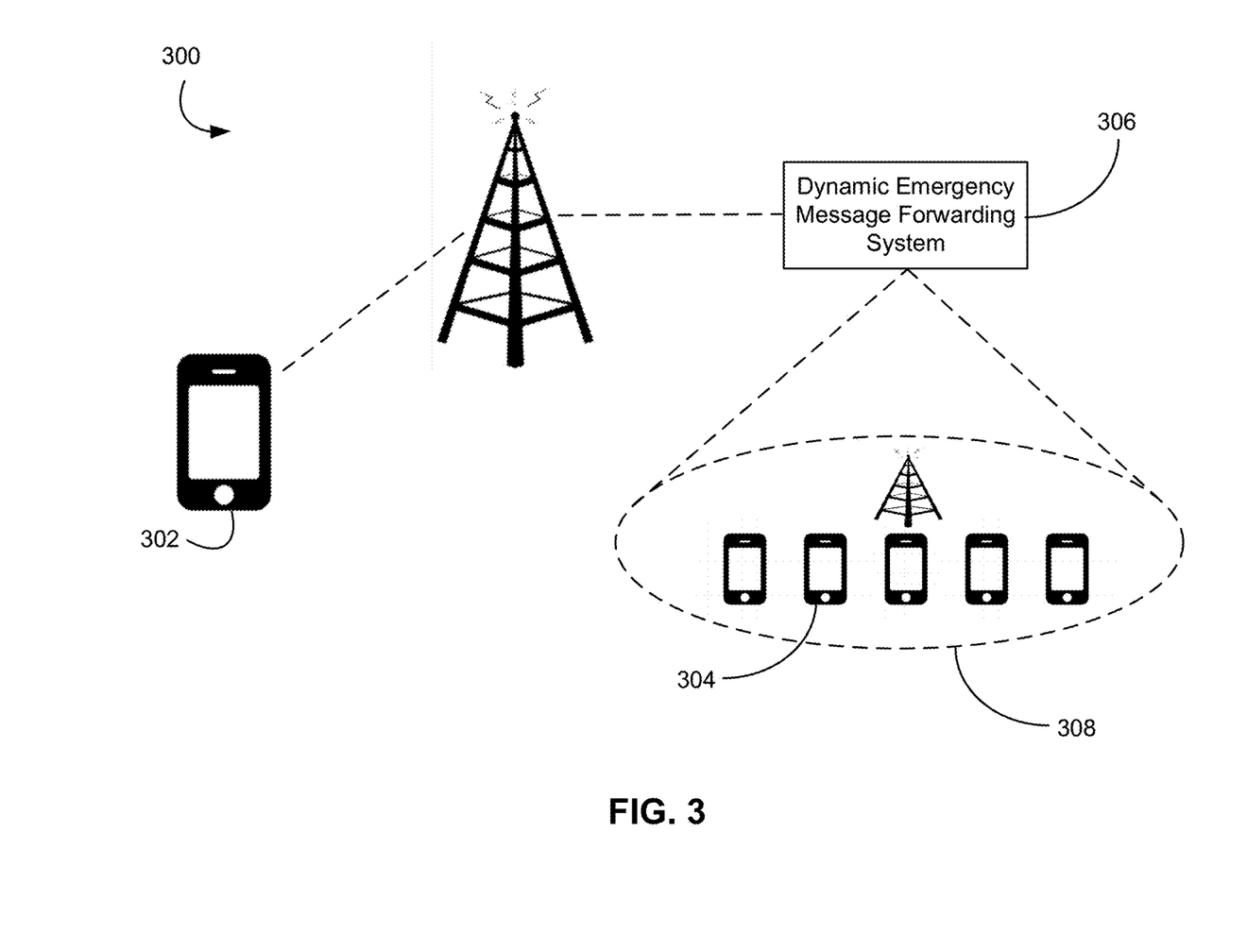
FIG. 3 is a high-level architecture, in accordance with one embodiment of the present invention.
Figure 5:
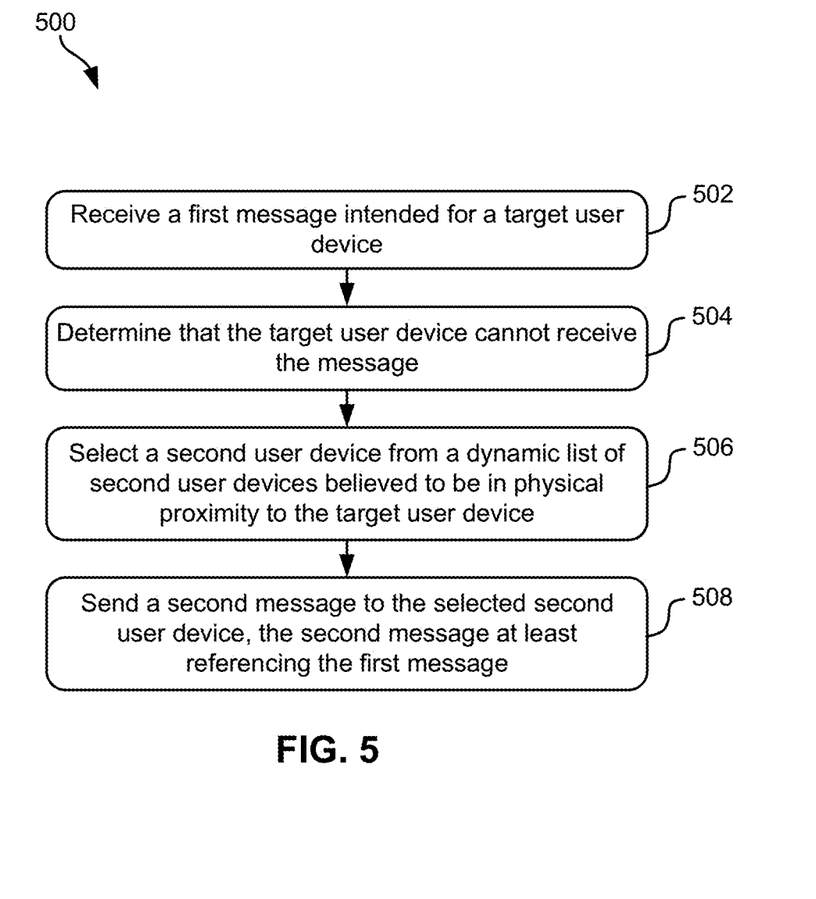
FIG. 5 is a flowchart of a method, in accordance with one embodiment of the present invention.

FIG. 3 is a high-level architecture for performing various operations of FIG. 5, in accordance with various embodiments. The architecture 300 may be implemented in accordance with the present invention in any of the environments depicted in FIGS. 1-2 and 4-5, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a source user device 302. The source user device 302 may be any type of user device known in the art. In various embodiments, the source user device 302 sends a message to a target user device 304. The target user device 304 may be any type of user device known in the art. In various embodiments, a dynamic emergency message forwarding system 306 receives a first message intended for a target user device 304 from the source user device 302.

The dynamic emergency message forwarding system 306 may perform at least some of the operations of method 500 to be described in further detail below. For example, the dynamic emergency message forwarding system 306 may determine that the target user device 304 is unavailable and select a second user device from a group of second user devices 308 believed to be in physical proximity to the target user device 304. Physical proximity may be determined based on information derived from Global Positioning Systems (GPS) integrated into the user devices. According to some embodiments, physical proximity may include user devices within a 10 foot radius of the target user device 304.

Physical proximity may be defined by the user, the service provider, the content provider, a default setting, etc.

The group of second user devices 308 may comprise any type of user devices known in the art. The group of second user devices 308 may be identified by the dynamic emergency message forwarding system 306 based on information insights including social media activities, contacts lists, pre-made emergency contact lists, information derived from GPS integrated into the user devices, etc. The group of second user devices 308 may be identified according to various modules of the architecture 400 and/or embodiments of method 500 to be discussed in detail below.

In a preferred embodiment, the group of second user devices 308 are user devices which are in physical proximity to the target user device 304 based on relative GPS locations and associated with the target user device 304. The group of second user devices 308 may be associated with the target user device 304 based on the information insights described above.

Figure 4:
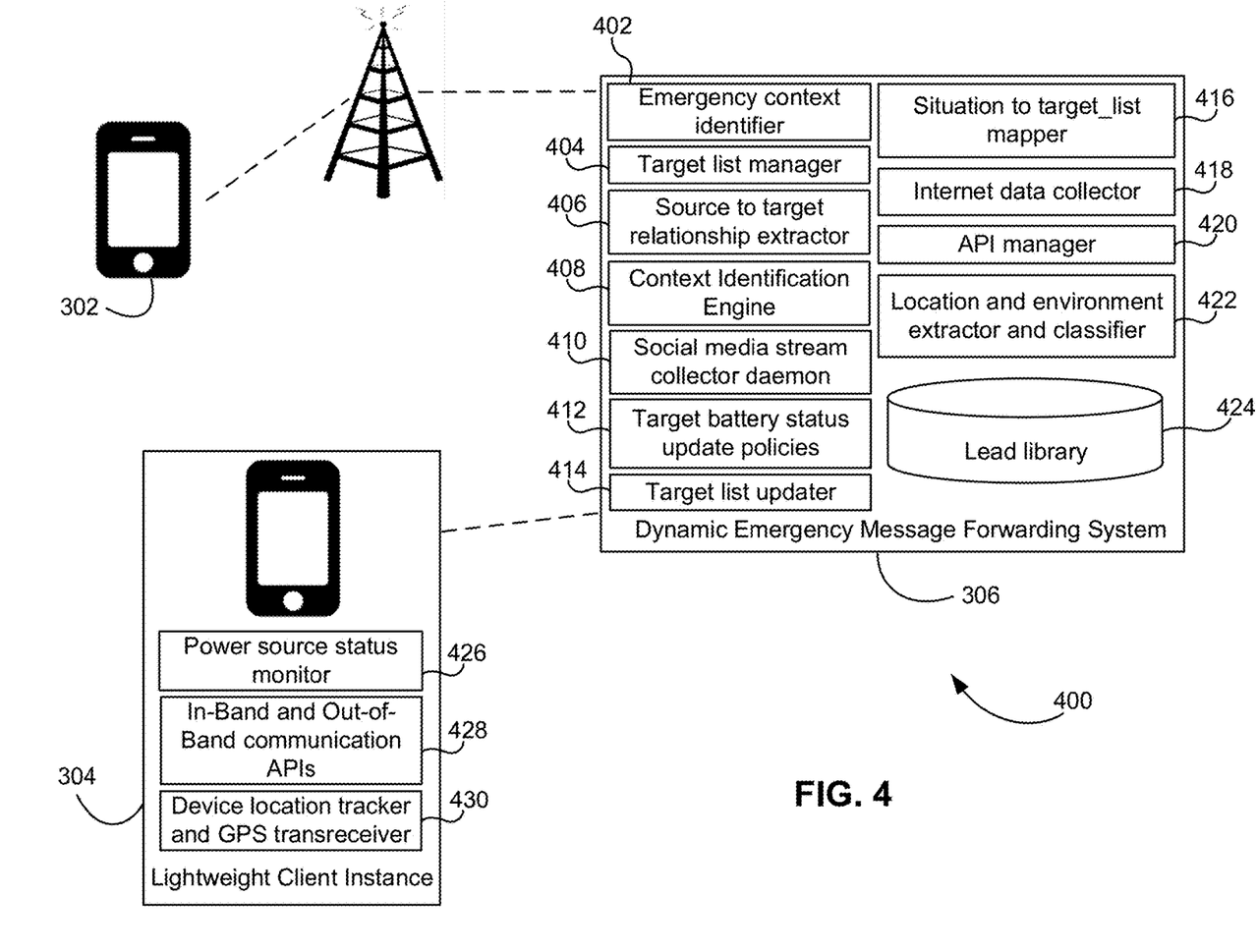
FIG. 4 is an exemplary detailed architecture, in accordance with one embodiment of the present invention.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 comprises a source user device 302. The source user device 302 may be any type of user device known in the art. In various embodiments, the source user device 302 sends a message to a target user device 304. The target user device 304 may be any type of user device known in the art. In various embodiments, a dynamic emergency message forwarding system 306 receives a first message intended for a target user device 304 from the source user device 302.

The dynamic emergency message forwarding system 306 may comprise an emergency context identifier 402. In a preferred approach, the emergency context identifier 402 determines the context of any message directed to the dynamic emergency message forwarding system 306 using natural language processing. Any known technique may be used to perform natural language processing including Google Cloud® Natural Language, Natural Language Toolkit, Apache Lucene™, Apache Solr™, Apache OpenNLP™ CoreNLP™, SpaCy®, etc. In a preferred embodiment, the natural language processing is performed using Watson™ Natural Language Understanding, Watson™ Tone Analyzer, and/or Watson™ Natural Language Classifier. (International Business Machines Corporation (IBM), 1 New Orchard Road, Armonk, N.Y. 10504, United States). Additional Watson APIs may be used to perform various operations of the methods described in further detail below in FIG. 5.

In a preferred approach, the emergency context identifier 402 determines whether the context is associated with an "emergency" or whether the context is associated with a "general message." In some approaches, the emergency context identifier 402 may be trained to determine whether the context is an "emergency" or "general" based on insights and/or communications provided by a user, a service provider, a content provider, etc. In other embodiments, the emergency context identifier 402 may comprise rules derived from the training input and/or communications. The rules may be predefined by a user, a service provider, a content provider, etc. In another preferred approach, the rules for determining whether the context is an "emergency" or "general" may be downloaded from an administrator site.

The dynamic emergency message forwarding system 306 may comprise a target list manager 404. In a preferred embodiment, the target list manager 404 stores a target list comprising the target user device 304 associated with an end user and a group of second user devices in close physical proximity to the target user device 304 (see the group of second user devices 308 of FIG. 3). Potential user devices for the target list may be identified by the source to target relationship extractor 406.

The source to target relationship extractor 406 may identify a source user device 302, a target user device 304, potential user devices for a target list of second user devices, etc., in any manner known in the art. In a preferred embodiment, the source to target relationship extractor 406 may use a mobile number of a source user device 302, a mobile number of a target user device 304, a GPS location of a source user device 302, a GPS location of a target user device 304, the GPS locations of any other user devices in physical proximity to the target user device, context of information insights provided to the dynamic emergency message forwarding system 306, etc., to identify the potential user devices for the target list.

The dynamic emergency message forwarding system 306 may comprise a context identification engine 408. In a preferred approach, the context identification engine 408 determines the context of the message including the time the message was sent, the time the message is to be delivered, the source user device 302 associated with the message, the target user device 304 associated with the message, keywords associated with the message, etc. In another embodiment, the context identification engine 408 may identify a context of other information insights directed to the dynamic emergency message forwarding system 306 including any social media content, content derived from smart device applications, etc. Any context may be determined using any of the natural language processing techniques described above and/or any other technique known in the art.

In one example, the context identification engine 408 may identify the context of a message as a message sent from a source user device 302 associated with a mother at 4:00 P.M. to a target user device 304 associated with a child. The context may include that the target user device 304 associated with a child is located at the nearest high school in close proximity to a group of second user devices associated with various friends in the child's contact list.

The dynamic emergency message forwarding system 306 may comprise a social media stream collector daemon 410. In a preferred approach, the social media stream collector daemon 410 collects information insights for the dynamic emergency message forwarding system 306 with the user's consent. The information insights may include any information derived from social media applications, information derived from other smart device applications, or any other application programming interface (API) known in the art. For example, the information insights may include posts, tags, likes, shares, pins, tweets, follows, etc. The social media stream collector daemon 410 may collect and/or extract information insights in any manner known in the art.

The dynamic emergency message forwarding system 306 may comprise a target power source status update policies 412. The target power source status update policies 412 may include policies that trigger and/or disable the various operations of method 500 to be discussed in detail below. The target power source status update policies 412 may be set by the user, the service provider, the content provider, default settings, etc. In one example, the target power source status update policies 412 trigger the operations of method 500 when the power source status of the target user device 304 is determined to be less than a predetermined threshold. In another example, the target power source status update policies 412 disable the operations of method 500 when the power source status of the target user device 304 is determined to be greater than a predetermined threshold. Any predetermined threshold disclosed herein may be set by the user, the service provider, the content provider, default settings, etc. Any predetermined value disclosed herein may be found in a look-up table.

In some approaches, the target power source status update policies 412 may include sending a notification to the target user device 304 when the power source status of the target user device 304 is determined to be less than a predetermined threshold. For example, target power source status update policies 412 may send a notification to the target user device 304 when the power source status of the target user device 304 is determined to be less than 10% and may trigger the operations of method 500 when the power source status of the target user device 304 is determined to be less than 5%.

The dynamic emergency message forwarding system 306 may comprise a target list updater 414. In a preferred embodiment, the target list updater 414 substantially continuously updates the target list according to various embodiments of method 500 described below, e.g., continuously or as often as the system can perform updates. In other approaches, the target list updater 414 updates the target list periodically, at some predefined interval (e.g. an interval of less than 10 seconds, less than 1 second, etc.), sporadically (e.g., based on output of a random number generator, upon occurrence of some predefined event such as when the screen is powered on), manually upon receipt of a command from a user, etc., as set by a user, a service provider, a content provider, default settings, etc.

In one embodiment, the target list updater 414 dynamically updates the target list based on an interrupt driven approach. In this approach, the interrupt driven approach includes notifying the target list updater 414 when new data is collected by any of the other modules in the architecture 400. The target list updater 414 may update the target list accordingly.

The dynamic emergency message forwarding system 306 may comprise a situation to target list mapper 416. The situation to target list mapper 416 may map any context derived from the emergency context identifier 402 and/or the context identification engine 408 to the target list which is managed by the target list manager 404 and updated by the target list updater 414. The context and the target list may be mapped using any mapping technique known in the art.

The dynamic emergency message forwarding system 306 may comprise an internet data collector 418. The internet data collector 418 may collect and/or extract any information insights from the internet as would be understood by one having ordinary skill in the art. In one approach, the internet data collector 418 may derive information insights from websites accessed by the user associated with the target user device 304 and provide the information insights to any other module in the dynamic emergency message forwarding system 306. For example, the internet data collector 418 may determine that the user has recently visited 3 websites about traveling to Arizona. The internet data collector 418 may provide that information as an input for the context identification engine 408.

The dynamic emergency message forwarding system 306 may comprise an API manager 420. The API manager 420 may manage information insights derived from any application as would be understood by one having ordinary skill in the art. The API manager 420 may provide information to be analyzed by any other modules of the dynamic emergency message forwarding system 306 as would be understood by one having ordinary skill in the art upon reading the present disclosure.

The dynamic emergency message forwarding system 306 may comprise a location and environment extractor and classifier 422. The location and environment extractor and classifier 422 can use any context deriving techniques as described above to identify a location context associated with the message, with the source user device 302, with the target user device 304, with second user devices included in the target list, etc. In a preferred approach, the location and environment extractor and classifier 422 compiles information insights derived from any other module in the dynamic emergency message forwarding system 306 to determine the location context of the message, the source user device 302, the target user device 304, the group of second user devices 308 included in the target list, etc.

The dynamic emergency message forwarding system 306 may comprise a lead library 424. The lead library 424 may store any information insights collected from any other module of the dynamic emergency message forwarding system 306 in any manner known in the art. In a preferred approach, the information insights are stored in a table.

Now turning to the target user device 304, the target user device 304 includes a power source status monitor 426. The power source status monitor 426 may monitor the power source status of the target user device 304 in any manner known in the art. In a preferred approach, the power source status monitor 426 communicates with the dynamic emergency message forwarding system 306 to communicate the power source status of the target user device 304 in order to enable and/or disable the operations of method 500 to be discussed in detail below.

The target user device 304 includes in-band and out-of-band communication APIs 428. Communications between various layers may be performed using any in-band protocol implementation known in the art. Out-of-band API infrastructures may be used to transmit data from a user end device to an application server and/or within the components of a server instance. The in-band and out-of-band communication APIs 428 provide communication messages as would be understood by one having ordinary skill in the art.

The target user device 304 includes a device location tracker and GPS transceiver 430. The device location tracker and GPS transceiver 430 may include any GPS and/or location-based technology known in the art. Information derived from the device location tracker and GPS transceiver 430 may be compared with GPS coordinates of second user devices of the target list to determine proximity.

In various embodiments, the modules described above, especially with reference to the modules of the dynamic emergency message forwarding system 306, communicate with different entities to collect information insights. The information insights, especially GPS location information of the target user device 304 and information insights gathered from social media streams, are stored and used to enable and/or disable dynamic message forwarding to the target user device 304. Dynamic message forwarding may be enabled and/or disabled according to the availability of the target user device. In a preferred approach, unavailability is defined by a low power source status. The power source status of the target user device 304 may be determined via communication between the various modules of the present disclosure and the target user device 304. In response to detecting unavailability of the target user device 304, the client instance of the target user device 304 may send a message to the dynamic emergency message forwarding system 306 to enable the various embodiments of method 500 to be discussed in detail below. The dynamic emergency message forwarding system 306 may forward a message and/or an indication of a message to one or more second user devices in the group of second user devices 308 on the target list. In a preferred embodiment, the target list comprising the target user device and a group of second user devices 308 is generated based on information insights gathered from the various modules including social media posts, user location, friend list, GPS locations, etc.

In one embodiment, the dynamic emergency message forwarding system 306 is enabled in response to detected unavailability of the target user device 304. A message may be received by the dynamic emergency message forwarding system 306 and analyzed to determine whether the context of the message is an emergency context or a general context. In response to determining the message comprises an emergency context, the message may be sent to one or more second user devices in the group of second user devices 308 on the target list.

In various preferred approaches, the dynamic emergency message forwarding system 306 determines whether a context of a first message is associated with an emergency in any manner described herein. In response to determining the context of the first message is not associated with an emergency, the dynamic emergency message forwarding system 306 may not send the second message to a selected second user device. In response to determining the context of the first message is associated with the emergency, the dynamic emergency message forwarding system 306 may send the second message to a selected second user device from the group of second user devices 308.

In a preferred approach, in response to detecting availability of the target user device, the dynamic emergency message forwarding system 306 may be disabled and the target user device 304 may receive a notification including whether any messages and/or indications of the messages were forwarded, the messages and/or indications of the messages that were forwarded, the contacts of who received the messages and/or indications of the messages, etc.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of ordinary skill in the art upon reading the present descriptions.

Each of the steps of the method 500 may be performed by any suitable component of the operating environment. For example, in various embodiments, the method 500 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 includes operation 502. Operation 502 includes receiving a first message intended for a target user device. The first message may be received in any manner known in the art.

Operation 504 includes determining that the target user device cannot receive the message. A target user device cannot receive the message while the target user device is unavailable. Unavailability may refer to low power source status, no power source status, no network connection, relatively poor network connection, silent mode, power off mode, etc., throughout the present disclosure as would be understood by one having ordinary skill in the art. Determining whether a target user device is unavailable may be performed in any manner known in the art.

Operation 506 includes selecting a second user device from a dynamic list of second user devices believed to be in physical proximity to the target user device. In one embodiment, the list includes at least one second user device. In a preferred embodiment, the list includes a plurality of second user devices.

In a preferred approach, the event includes receipt of an indication from the target user device that the target user device is expected to become unavailable. The indication from the target user device that the target user device is expected to become unavailable may indicate that the target user device is expected to become unavailable at some point in time in the near future (e.g., in the next 5 minutes). The list of second user devices may be generated in response to receiving the indication.

In one embodiment, the indication corresponds to a power source level of the target user device. Any known mechanism may be used to determine the power source level of the target user device. In a preferred embodiment, the indication is sent in response to determining that the power source level of the target user device is below a predetermined threshold. Any predetermined threshold disclosed herein may be set by the user, the service provider, the content provider, default settings, etc. For example, the indication may be sent when the power source level of the target user device is determined to be less than 10%. Any predetermined threshold disclosed herein may be found in a look-up table.

In some approaches, the indication corresponds to expected entry of the target user device into an area known to have at least poor connectivity. An area known to have at least poor connectivity may be determined by historical poor connectivity of the target user device in the area, information derived from the service provider for the target user device, etc. In some instances, the area may be known to have no connectivity from the network to the target user device. The lack of connectivity may be similarly determined. In some approaches, a second user device that uses a different wireless carrier having more reliable service in that area may be selected to receive the message.

In another approach, operation 506 includes creating the dynamic list of second user devices in response to occurrence of an event. The event may include passage of a predetermined amount of time. The predetermined amount of time may be a predetermined time interval, a time period since the last list was created and/or a second message was sent, etc. The predetermined amount of time may be any amount of time set by the user, the content provider, the service provider, default settings, etc.

In a preferred embodiment, the list of second user devices is created based on at least one criterion selected from the group consisting of: GPS coordinates of each second user device, social media information, travel information, and a contact list associated with the target user device. Any combination of the above criterion may be used to create the list of second user devices. In preferred embodiments, each criterion may be assigned a weight and the group of second user devices may be based on second user devices with a relatively higher calculated weighted average. In a preferred embodiment, the list of second user devices is created based on the GPS coordinates of the second user devices and at least one other criterion.

In another preferred embodiment, the selected second user device is selected from the list of second user devices based on at least one criterion selected from the group consisting of: GPS coordinates of each second user device, social media information, travel information, and a contact list associated with the target user device. Any combination of the above criterion may be used to select the second user device. In preferred embodiments, each criterion may be assigned a weight and the second user device may be selected based on the selected second user device having a relatively higher calculated weighted average compared to other second user devices on the list of second user devices. Assigned weights for each criterion may be set and/or determined in any manner known in the art. A weighted average may be calculated in any manner known in the art.

For example, a social media tag and a recent text message conversation may be associated with relatively higher weights than a weight associated with inclusion in a contact list. A second user device may be selected from a list of second user devices (e.g., where the other second user devices are only included on the contact list associated with the target user device) based on a relatively higher weighted average of a social media tag and a recent text message conversation compared to the weighted average of inclusion on a target list.

In a preferred approach, the GPS coordinates of each second user device are gathered in any manner known in the art to determine whether the second user device is in physical proximity to the target user device. For example, second user devices within a 10 feet radius of the target user device may be selected for generating the list of second user devices.

In another approach, social media information derived from social media applications running on the target user device and/or the second user devices may be analyzed to determine whether the users associated with the devices know each other. For example, a post generated by a target user device tagging users associated with second user devices may be used to generate the list of second user devices comprising the users tagged in the post.

In yet another approach, the contact list of the user associated with the target user device may be used to identify second user devices to generate the list.

In other approaches, creating the list of second user devices includes receiving information insights. The information insights may be received in any manner known in the art. The information insights may comprise social media content including tags, posts, likes, shares, tweets, pins, etc. Other information insights which may be derived from social media content may include one or more destinations, travelling speed, expected time to one or more destinations, etc. The users may be identified from social media content associated with the target user device. Creating the list of second user devices may include identifying users associated with second user devices within the information insights.

For example, a second user device associated with a user may be added to the list of second user devices because the user is tagged in a social media post with the user associated with the target user device. In another example, a second user device may be deleted from the list of second user devices because the dynamic emergency message forwarding system determined that the second user device is no longer in physical proximity to the target user device. In various approaches, the list of second user devices may be updated in response to receiving new information insights, second user device(s) entering and/or exiting the physical proximity of the target user device, based on a predetermined amount of time, etc.

In a preferred embodiment, the selected second user device is selected from among a plurality of second user devices based on a computed context of the first message. In various approaches, the context of the message may be analyzed to determine whether the message is associated with an "emergency" or a "general context." The context of the message may be analyzed using any technique known in the art as discussed above. A second user device may be selected from among the plurality of second user devices based on the computed context of first message being determined to be an emergency.

Operation 508 includes sending a second message to the selected second user device. In a preferred embodiment, the second message at least references the first message. In one embodiment, the second message may be sent to all the second user devices from a list of second user devices. The second message may include at least portions of the first message and/or a link thereto. In another approach, the second message is a forwarded version of the first message.

In various preferred approaches, operation 508 determines whether a context of a first message is associated with an emergency in any manner described herein. In response to determining the context of the first message is not associated with an emergency, operation 508 may not send the second message to a selected second user device. In response to determining the context of the first message is associated with the emergency, operation 508 may send the second message to a selected second user device.

In a preferred embodiment, method 500 includes determining whether the first message is a confidential emergency message or a general emergency message. Any natural language parsing technique known in the art may be used to determine whether the first message is a confidential emergency message or a general emergency message. Any known technique may be used to perform natural language processing including Google Cloud® Natural Language, Natural Language Toolkit, Apache Lucene™ Apache Solr™, Apache OpenNLP™, CoreNLP™, SpaCy®, etc. In a preferred embodiment, the natural language processing is performed using Watson™ Natural Language Understanding, Watson™ Tone Analyzer, and/or Watson™ Natural Language Classifier. In response to determining that the first message is a confidential emergency message, the second message may include a reference to the first message and/or selected portions of the first message which are not confidential. In response to determining that the first message is a general emergency message, the second message can be the forwarded version of the first message.

In one example, John is on a road trip and his smart phone is turned off due to a drained power source. He is with a group of friends, but his parents do not know who the friends are, nor any contact information associated with any of the friends. Various embodiments of the present invention provide the ability to use social media applications (e.g., Facebook, WhatsApp, Instagram, etc.) to forward an emergency message from John's parents to a second user device associated with one of the friends. If the message is determined to be a confidential emergency message (e.g., "Your uncle Tim is in trouble"), the second user device may only receive a notification that John's parents are trying to reach John. For example, the second user device may receive a notification including, "If you are with John, Mr. Smith is trying to reach him." If the message is determined to be a general emergency message (e.g., "Call me back ASAP"), the second user device may receive the general emergency message.

In various approaches, the operations of method 500 may reiterate for each new message which is received during unavailability of the target user device. In response to determining that the target user device is available, the operations of method 500 may terminate and any messages may be received by the target user device per normal operation as would be understood by one having ordinary skill in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   creating a dynamic list of second user devices in response to occurrence of an event,
      wherein the event includes receipt of an indication from a target user device that the target user device is expected to become unavailable in the near future,
      wherein the dynamic list is created and/or updated based on information insights corresponding to activities of a user associated with the target user device,
      wherein the dynamic list is created and/or updated based on at least two criteria selected from the group consisting of: GPS coordinates of each second user device, social media information, travel information, and a contact list associated with the target user device,
      wherein each criterion is assigned a weight;
   receiving a first message intended for the target user device;
   determining that the target user device is unavailable;
   selecting a second user device from the dynamic list of second user devices believed to be in physical proximity to the target user device, wherein the selected second user device is selected based on the selected second user device having a relatively higher weighted average compared to other second user devices; and
   sending a second message to the selected second user device, the second message at least referencing the first message.

2. The computer-implemented method of claim 1, comprising:
   determining whether a context of the first message is associated with an emergency; and
   in response to determining the context of the first message is not associated with the emergency, not sending the second message to the selected second user device.

3. The computer-implemented method of claim 1, wherein the second message is a forwarded version of the first message.

4. The computer-implemented method of claim 1, comprising:
   determining a category for the first message, wherein the category is selected from the group consisting of: a confidential emergency message and a general emergency message; and
   in response to determining that the category is a confidential emergency message, sending the second message to the selected second user device, wherein at least part of the first message is redacted.

5. The computer-implemented method of claim 4, comprising: in response to determining that the category is a general emergency message, sending the second message to the selected second user device, wherein the second message is a forwarded version of the first message.

6. The computer-implemented method of claim 1, wherein the indication corresponds to a power source level of the target user device, wherein the indication indicates that the power source level of the target user device is below a predetermined threshold.

7. The computer-implemented method of claim 1, wherein the indication corresponds to expected entry of the target user device into an area known to have at least poor connectivity, wherein the indication indicates that the target user device is expected to enter into the area within a predetermined period of time.

8. The computer-implemented method of claim 1, wherein the event includes passage of a predetermined amount of time.

9. The computer-implemented method of claim 1, wherein the indication corresponds to detecting activation of a silent mode associated with the target user device.

10. The computer-implemented method of claim 1, wherein the target user device is expected to become unavailable upon entry into an area based on historically poor connectivity in the area.

11. A system comprising:
a processor; and
logic integrated with the processor, executable by the processor, or integrated with and executable by the processor, the logic being configured to:
receive a first message intended for a target user device;
determine that the target user device cannot receive the first message;
select a second user device from a dynamic list of second user devices believed to be in physical proximity to the target user device,
wherein the dynamic list is created and/or updated based on at least two criteria selected from the group consisting of: GPS coordinates of each second user device, social media information, travel information, and a contact list associated with the target user device,
wherein each criterion is assigned a weight,
wherein the selected second user device is selected based on the selected second user device having a relatively higher weighted average compared to other second user devices,
wherein the dynamic list of second user devices is created in response to occurrence of an event,
wherein the event includes receipt of an indication from the target user device,
wherein the indication corresponds to a power source level of the target user device,
wherein the dynamic list of second user devices is generated in response to receiving the indication; and
send a second message to the selected second user device, the second message at least referencing the first message.

12. The system of claim 11, comprising logic configured to:
determine whether a context of the first message is associated with an emergency; and
in response to determining the context of the first message is not associated with the emergency, not send the second message to the selected second user device.

13. The system of claim 11, wherein the second message is a forwarded version of the first message.

14. The system of claim 11, wherein the indication corresponds to expected entry of the target user device into an area known to have at least poor connectivity, wherein the indication indicates that the target user device is expected to enter into the area known within a predetermined period of time.

15. The system of claim 11, wherein the event includes passage of a predetermined amount of time.

16. A computer program product to forward emergency messages, the computer program product comprising a computer readable storage medium having program instructions embodied therewith, the program instructions executable by a computer to cause the computer to:
receive, by the computer, a first message intended for a target user device;
determine, by the computer, that the target user device cannot receive the first message;
select, by the computer, a second user device from a dynamic list of second user devices believed to be in physical proximity to the target user device,
wherein the dynamic list is created and/or updated based on at least two criteria selected from the group consisting of: GPS coordinates of each second user device, social media information, travel information, and a contact list associated with the target user device,
wherein each criterion is assigned a weight,
wherein the selected second user device is selected based on the selected second user device having a relatively higher weighted average compared to other second user devices,
wherein the dynamic list of second user devices believed to be in physical proximity to the target user device is based at least in part on information insights corresponding to activities of a user associated with the target user device; and
send, by the computer, a second message to the selected second user device, the second message at least referencing the first message.

17. The computer program product of claim 16, comprising program instructions to cause the computer to: create, by the computer, the dynamic list of second user devices in response to occurrence of an event, wherein the event includes receipt of an indication from the target user device that the target user device is expected to become unavailable in the near future.

18. The computer program product of claim 17, wherein the indication corresponds to detecting activation of a silent mode associated with the target user device.

* * * * *